United States Patent
Madoux et al.

(10) Patent No.: US 10,632,837 B2
(45) Date of Patent: Apr. 28, 2020

(54) VALVE APPARATUS FOR VENTING A LIQUID TANK

(71) Applicant: Plastic Omnium Advanced Innovation and Research, Brussels (BE)

(72) Inventors: Dominique Madoux, Rumes (BE); Jules-Joseph Van Schaftingen, Wavre (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 63 days.

(21) Appl. No.: 15/780,439

(22) PCT Filed: Dec. 7, 2016

(86) PCT No.: PCT/EP2016/080102
§ 371 (c)(1),
(2) Date: May 31, 2018

(87) PCT Pub. No.: WO2017/097841
PCT Pub. Date: Jun. 15, 2017

(65) Prior Publication Data
US 2018/0354358 A1 Dec. 13, 2018

(30) Foreign Application Priority Data

Dec. 8, 2015 (EP) .................................... 15198453

(51) Int. Cl.
*F16K 31/18* (2006.01)
*B60K 15/035* (2006.01)
(Continued)

(52) U.S. Cl.
CPC .......... *B60K 15/035* (2013.01); *F16K 24/042* (2013.01); *B60K 2015/03289* (2013.01); *B60K 2015/03509* (2013.01); *F16K 31/18* (2013.01)

(58) Field of Classification Search
CPC .. B60K 2015/03289; B60K 2015/3509; B60K 15/035; F16K 31/18; F16K 24/042
(Continued)

(56) References Cited

U.S. PATENT DOCUMENTS 5,413,137 A    5/1995  Gimby
5,944,044 A *  8/1999  King ................ B60K 15/03519
                                                     137/202
(Continued)

FOREIGN PATENT DOCUMENTS

EP    1 488 947 A2   12/2004
EP    1 642 760 A2    4/2006

OTHER PUBLICATIONS

International Search Report dated Feb. 28, 2017, in PCT/EP2016/080102 filed Dec. 7, 2016.

*Primary Examiner* — Umashankar Venkatesan
(74) *Attorney, Agent, or Firm* — Oblon, McClelland, Maier & Neustadt, L.L.P.

(57) ABSTRACT

A valve apparatus for use in a liquid tank, includes a casing, an extractor, and a float. The casing defines a main chamber, the main chamber having an inlet orifice and at least one outlet orifice. The extractor includes at least one wall member extending substantially across the main chamber and being adapted for extracting droplets present in a vapour stream coming from the liquid tank and entering the main chamber via the inlet orifice. The float includes a closure element capable of closing off the outlet orifice(s), the float being slidably mounted along the at least one wall member.

25 Claims, 4 Drawing Sheets

(51) Int. Cl.
*F16K 24/04* (2006.01)
*B60K 15/03* (2006.01)

(58) Field of Classification Search
USPC .......................................... 137/202, 43, 587
See application file for complete search history.

(56) References Cited

U.S. PATENT DOCUMENTS

| | | | | |
|---|---|---|---|---|
| 6,331,021 B1* | 12/2001 | Wilson | ................. | B60K 15/035 |
| | | | | 285/226 |
| 6,405,747 B1* | 6/2002 | King | ................. | B60K 15/03519 |
| | | | | 137/202 |
| 7,089,954 B2* | 8/2006 | Crawford | ......... | B60K 15/03519 |
| | | | | 137/202 |
| 2002/0017281 A1* | 2/2002 | Crary | ................... | B60K 15/035 |
| | | | | 123/516 |
| 2002/0124909 A1* | 9/2002 | Groom | ............. | B60K 15/03519 |
| | | | | 141/192 |
| 2002/0144730 A1* | 10/2002 | Brock | .............. | B60K 15/03504 |
| | | | | 137/202 |
| 2006/0070656 A1 | 4/2006 | Crawford | | |
| 2018/0370350 A1* | 12/2018 | Schmid | ............ | B60K 15/03177 |

\* cited by examiner

VALVE APPARATUS FOR VENTING A LIQUID TANK

CROSS-REFERENCE TO RELATED APPLICATIONS

This application is a United States national stage application of International Application No. PCT/EP2016/080102, filed Dec. 7, 2016, which designates the United States, and claims priority to European Patent Application No. 15198453.1, filed Dec. 8, 2015. The entire contents of each of the above applications are hereby incorporated herein by reference in entirety.

The present invention relates to a valve apparatus for the venting of a liquid tank, in particular a fuel tank with which a motor vehicle may be equipped.

In fuel systems it is known to use a float valve to avoid allowing substantial amounts of liquid fuel to pass into the venting line that runs to a vapour storage canister.

It is known to use float valves equipped with baffles (or walls) to reduce the risk of liquid carried over into the canister. Such baffles are generally designed to separate the liquid droplets carried by the vapour stream. An example of a known float valve equipped with baffles is described in patent document U.S. Pat. No. 6,405,747. These known float valves are bulky and are not suited for placement in an internal area of the tank where there is minimal height between the bottom of the tank and the top of the tank as well as minimal height between the full tank liquid height and the top of the tank. These known float valves can be made short and wide, but since the height at which the valve shuts off becomes close to the height of the venting orifice, there is an increasing risk of fluid getting through before the valve closes.

The object of embodiments of the invention is to provide a valve apparatus of reduced height, and which reduces or suppresses the risk of outflow of liquid to a canister for example.

According to an aspect of the invention, there is provided a valve apparatus for use in a liquid tank, said valve apparatus comprising:
  a casing defining a main chamber, the main chamber having an inlet orifice and at least one outlet orifice;
  a float comprising a closure element capable of closing off the outlet orifice(s), the float being movable upward and downward inside the main chamber;
  extracting means comprising at least one wall member extending substantially across the main chamber and being adapted for extracting droplets present in a vapour stream coming from the liquid tank and entering the main chamber via the inlet orifice;
The float is such that it is slidably mounted along said at least one wall member.

The valve apparatus according to the invention is intended for the venting of a tank, which may contain any liquid. In particular, the liquid may be a fuel. The tank may be intended for any use, especially for equipping a vehicle and more especially for equipping a motor vehicle. In a particular embodiment, the size and shape of the casing of the valve apparatus according to the invention can be chosen in such a way that the valve apparatus can be entirely disposed in the interior of the tank, preferably by attachment to the inside of the top wall of the tank. In a particular embodiment, the casing of the valve apparatus comprises a top surface comprising a bonding feature for facilitating the welding of the casing to the interior of the tank. In another particular embodiment, the casing of the valve apparatus comprises bonding features for facilitating the welding of the casing to the external surface of the top wall of the tank. In another particular embodiment, the casing of the valve apparatus is a part or is fixed to a flange or a support adapted to be attached to the tank. The main chamber can have one outlet orifice. Alternatively, the main chamber can have several outlet orifices. With this latter particular configuration, the reopening pressure can be reduced.

Embodiments of the invention are based inter alia on the inventive insight that the float and the extracting means can be slotted together to provide a sliding arrangement. More in particular, the inventors have realised that the float and the extracting means do not need to be positioned at two different heights (i.e. stacked one on top of the other) within the same chamber, and that it is possible to overlap those two elements in a manner such that the float can slide over the extracting means. In other words, embodiments of the invention can perform the same functionalities as prior art solutions, whilst having the advantage of being more compact.

The wall member(s) act(s) as a liquid vapour separator unit and as a sliding guide for the float. The float is slidable over at least one portion of the wall member(s).

The float is slidable from a downward position in which the outlet orifice(s) is(are) opened and an upward position in which the outlet orifice(s) is(are) closed off by the closure element.

In an advantageous embodiment, the wall member(s) extend(s) vertically from the bottom to the top of the main chamber to facilitate the upward and downward sliding movements of the float.

In an advantageous embodiment, the extracting means are made integral with the casing. The extracting means and the casing can be manufactured by injection molding process or by additive manufacturing process (i.e. 3D printing).

The valve apparatus according to the invention allows a liquid tank to be vented, both in normal operation and when filling. Further, it has the function of preventing ingress of liquid in the event of a vehicle rolling over or being excessively tilted.

Advantageously, the constituent elements of the valve apparatus may be made of any material. Preferably, they are based on a thermoplastic. In this case, it is obviously convenient to choose the material or materials in such a way that they withstand the operating stresses. Of course, the materials chosen must be inert with respect to the liquids with which they have to be in contact, in particular inert with respect to fuels.

In particular in the case in which the liquid tank is a fuel tank made of plastic, most of the constituent elements of the valve apparatus according to the invention are also made of plastic. The term "plastic" is understood to mean any polymeric synthetic material, whether thermoplastic or thermosetting, as well as blends of at least two of these materials. The intended polymers comprise both homopolymers and copolymers (especially binary or ternary copolymers). Examples of such copolymers are, non-limitingly: random copolymers, linear block copolymers, non-linear block copolymers, and graft copolymers. Thermoplastic polymers, including thermoplastic elastomers, and blends thereof are preferred. Any type of thermoplastic polymer or copolymer is suitable.

In a particular embodiment, the closure element is made of rubber. In a particular embodiment, the closure element can be a needle seal or a ribbon seal.

In a first particular configuration, the extracting means comprise a plurality of concentric walls defining a plurality of concentric areas, each concentric wall comprising a passage adapted to allow two adjacent concentric areas to be in fluid communication with each other.

In an advantageous embodiment, the plurality of concentric areas comprise at least an outer area in fluid communication with the inlet orifice and a central inner area in fluid communication with the outlet orifice(s), and wherein the float comprises a main float supporting the closure element and at least one secondary float connected to the main float, said at least one secondary float being slidably disposed in the outer area and said main float being slidably disposed in the central inner area.

Advantageously, the passages of the concentric walls are offset to one another, preferably they are arranged crosswise (90°) or at opposite (180°) to one another. This geometry prevents direct flow between the various partitions (i.e. concentric areas) and therefore creates an optimal labyrinth effect.

With this first particular configuration, it is proposed to use the plurality of concentric walls to create an extended flow path between the inlet orifice and the outlet orifice(s). By "extended flow path" it is understood that the distance from the inlet orifice to the outlet orifice(s) is longer compare to the distance of a straight-line path between the inlet orifice and the outlet orifice(s). Thus, the time that it takes to a fluid for traveling along the extended flow path is greater than the time it would take to the fluid for traveling along the straight-line path. In a particular embodiment, the length of the extended flow path can be set such that it is at least two times, preferably higher than four times, longer than the straight-line path. In this first particular configuration, when the liquid in the liquid tank passes through the inlet orifice, the secondary float(s) starts to move upward by buoyancy. Advantageously, the secondary float(s) pull the main float to move upward, since the secondary float(s) is linked (i.e. connected) to the main float. Therefore, the closure element (moved by the main float) can close off the outlet orifice(s), before the liquid reaches the central inner area. It is an advantage of this first particular configuration that the liquid can be prevented from flowing out of the outlet orifice(s).

In a second particular configuration, the extracting means comprise a spiral-shaped wall or helical-shaped wall. With this second particular configuration, it is proposed to use a spiral-shaped wall to create an extended flow path between the inlet orifice and the outlet orifice(s). Another advantage of this second particular configuration is that the pressure drop in the valve can be reduced. The external shape of the float is obviously matched to that of the spiral-shaped wall in which it has to be able to slide.

In a first advantageous embodiment, the float comprises a spiral-shaped float. Thus, the spiral-shaped float starts to move upward by buoyancy when the liquid passes through the inlet orifice and the closure element (mounted on the center of the spiral-shaped float) can close off the outlet orifice(s), before the liquid reaches the center of the spiral that is arranged to be in fluid communication with the outlet orifice(s). Therefore, liquid can be prevented from flowing out of the outlet orifice(s).

In a second advantageous embodiment, the float comprises a main float supporting the closure element and at least one secondary float connected to the main float, said at least one secondary float being slidably disposed in a first area delimited by a first portion of the spiral-shaped wall, the first area being in fluid communication with the inlet orifice, and said main float being slidably disposed in a second area delimited by a second portion of the spiral-shaped wall, the second area being in fluid communication with the outlet orifice(s). Thus, when the liquid in the liquid tank passes through the inlet orifice, the secondary float(s) starts to move upward by buoyancy, thus pulling the main float to move upward. Therefore, the closure element can close off the outlet orifice(s), before the liquid reaches the second area. Therefore, liquid can be prevented from flowing out of the outlet orifice(s).

In a particular embodiment, the main chamber comprises an opening for entry of fluid into the first area of the spiral, and wherein the position of the opening is transversally offset with respect to the position of the inlet orifice. With this arrangement, the length of the extended flow path is further increased. Moreover, it is an advantage of this embodiment that the upward (axial) forces applied by the fluid to the float can be suppressed or at least reduced, by arranging said opening away from the center of the casing (i.e. position of the inlet orifice). In other words, the corking flow can be reduced, thus allowing the valve apparatus to operate at a higher flow rate. Advantageously, the extended flow path and said opening may be shaped and arranged in a way such that the valve apparatus of the present invention can operate as a Fill Limit Vent Valve (FLVV).

In the particular case when the valve apparatus is used in a fuel tank, said fluid is a mixture of air and fuel vapour.

In a particular embodiment, the casing of the valve apparatus further comprises a collection and discharge chamber for the droplets, which is positioned at the bottom of the main chamber. Thus, the droplets that have been entrained with the gases can be collected and returned back to the tank, for example by gravity.

In a particular embodiment, the extracting means comprise protruding grooves adapted to guide the droplets towards the collection and discharge chamber. Advantageously, the droplets drip along those protruding grooves to end up into the collection and discharge chamber. Such protruding grooves secure the collection of the droplets and reduce the risk of outflow of liquid. The grooves can protrude inwardly or outwardly from the surface of the wall members of the extracting means.

In another particular embodiment, the protruding grooves can be replaced by pins. Such pins present the advantage to guide the droplets to a collection chamber by the combination of the centrifugal force and the gravity. Said collection chamber is used to discharge the droplets in the liquid tank.

According to another aspect of the invention, there is provided a valve assembly comprising a common support supporting a valve apparatus as described above. In a particular embodiment, the common support is further adapted to support other components: another type of valve, a sensor, a fluid conduct, electrical wires.

According to another aspect of the invention, there is provided a fuel tank comprising at least one valve apparatus or valve assembly as described above, said at least one valve apparatus or valve assembly being attached to said fuel tank.

According to another aspect of the invention, there is provided a motor vehicle comprising a fuel tank as described above.

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

Throughout the figures, like reference numerals have been used to designate like features.

The present invention provides a valve apparatus for the venting of a liquid tank. In a particular embodiment, the valve apparatus of the present invention can be used in a fuel tank of a motor vehicle. The valve apparatus of the present invention can work as a Roll-Over Valve (ROV) or a Fill Limit Vent Valve (FLVV).

"Fuel" is understood to designate a mix of liquid or liquefied hydrocarbons, as normally used to power internal combustion engines, including fuels known as gasoline, diesel, ethanol, etc. The valve apparatus of the present invention is particularly suited for venting fuel tanks containing fuel having a relatively high vapour pressure such as gasoline.

The fuel tank used in conjunction with the invention is preferably made of plastic.

The wall of the fuel tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

When the valve apparatus according to the present invention is attached to a fuel tank, it is preferably attached thereto by welding. The welding can be performed during the parison moulding stage of the fuel tank. Alternatively, the welding can be performed after or during the fuel tank finishing operations (boring and welding).

Alternatively, the valve apparatus can be attached onto the inner side of an injected shell of a fuel tank or a urea tank by hot plate welding or laser welding.

Alternatively, the valve apparatus can also be attached onto the inner side of a tank shell by an infra-red welding process. Such process is for example described in patent document U.S. Pat. No. 7,829,819.

Alternatively, the valve apparatus can be attached to the tank by plastic overmoulding process.

Alternatively, the valve apparatus can be attached to the tank by a locking ring system or by any other mean known in the state of the art.

Figure 1:
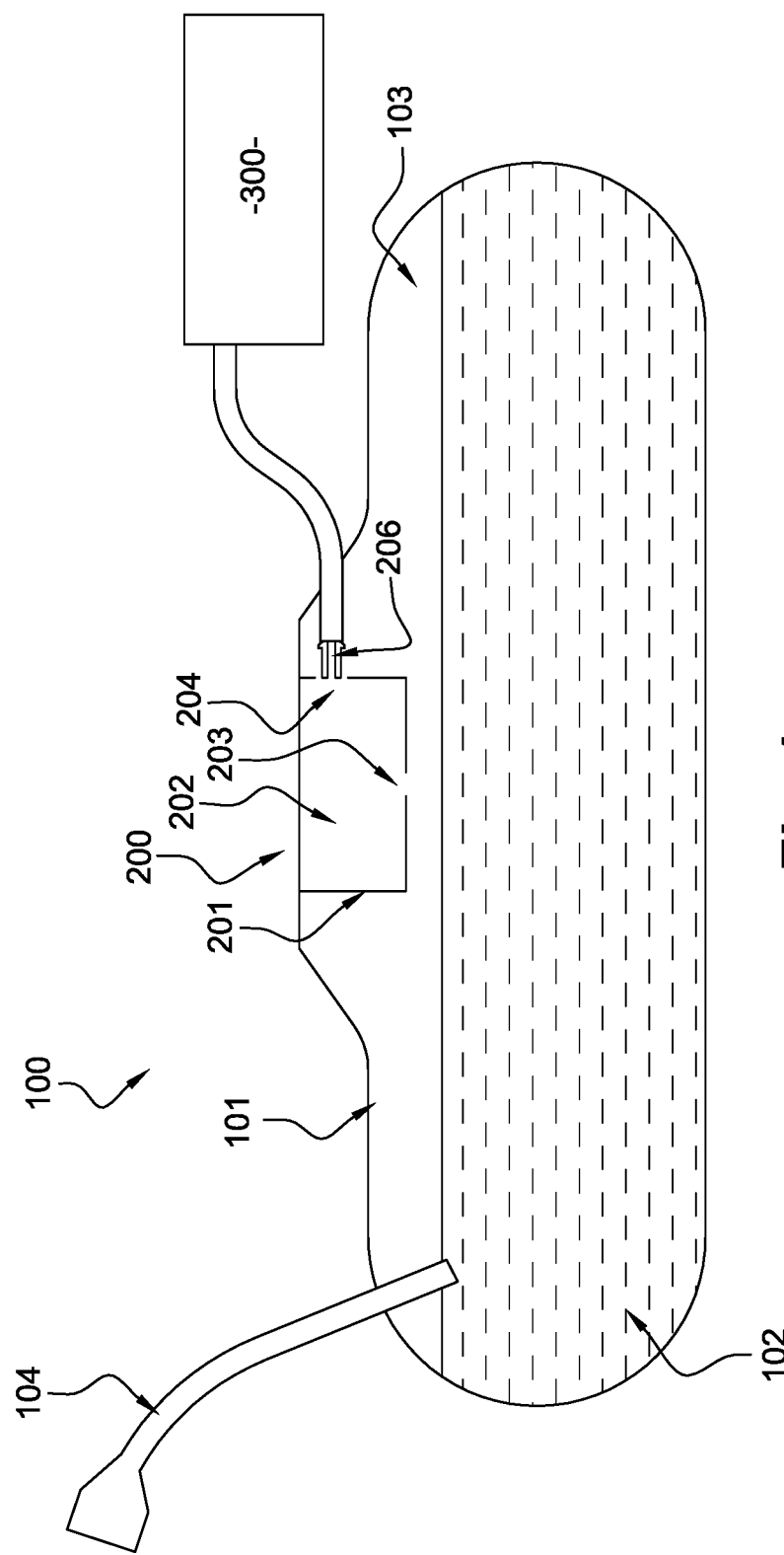
FIG. 1 illustrates schematically a valve apparatus according to an embodiment of the invention, installed in an exemplary manner in a fuel tank.

FIG. 1 depicts a sectional schematic view of a fuel tank 100 having a tank shell 101. A tank filler pipe 104 provides an entry for fuel into the fuel tank 100. The fuel tank 100 normally has a certain volume of liquid fuel 102 and vapor space 103. A valve apparatus 200 according to the present invention is disposed within the fuel tank 100. The valve apparatus 200 can be welded on the outer face or the inner face (i.e. internal wall) of the tank shell 101. The valve apparatus 200 can also be attached by using rivet-snapping or dovetail technique. Such techniques are well known for a skill person and should therefore not be explained further.

Figure 2:
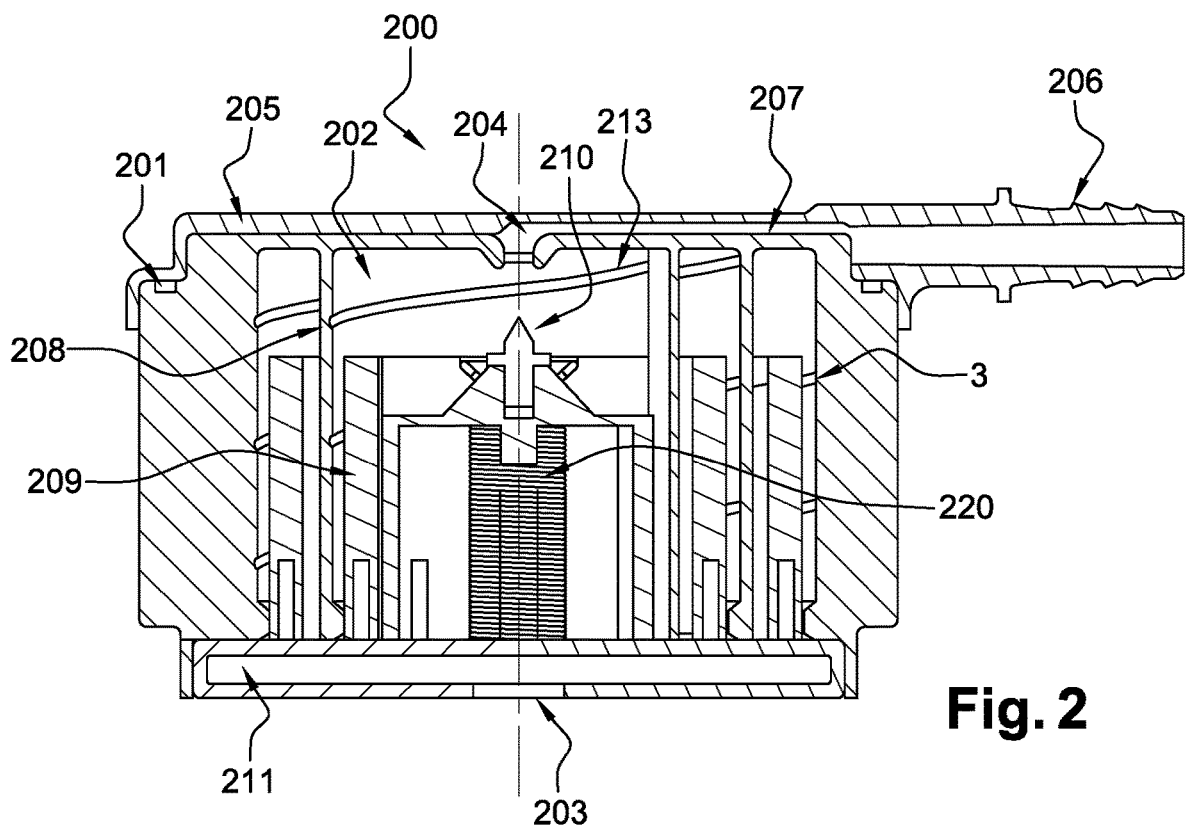
FIG. 2 illustrates schematically a cross-section view of the valve apparatus of FIG. 1, with a float.
Figure 3:
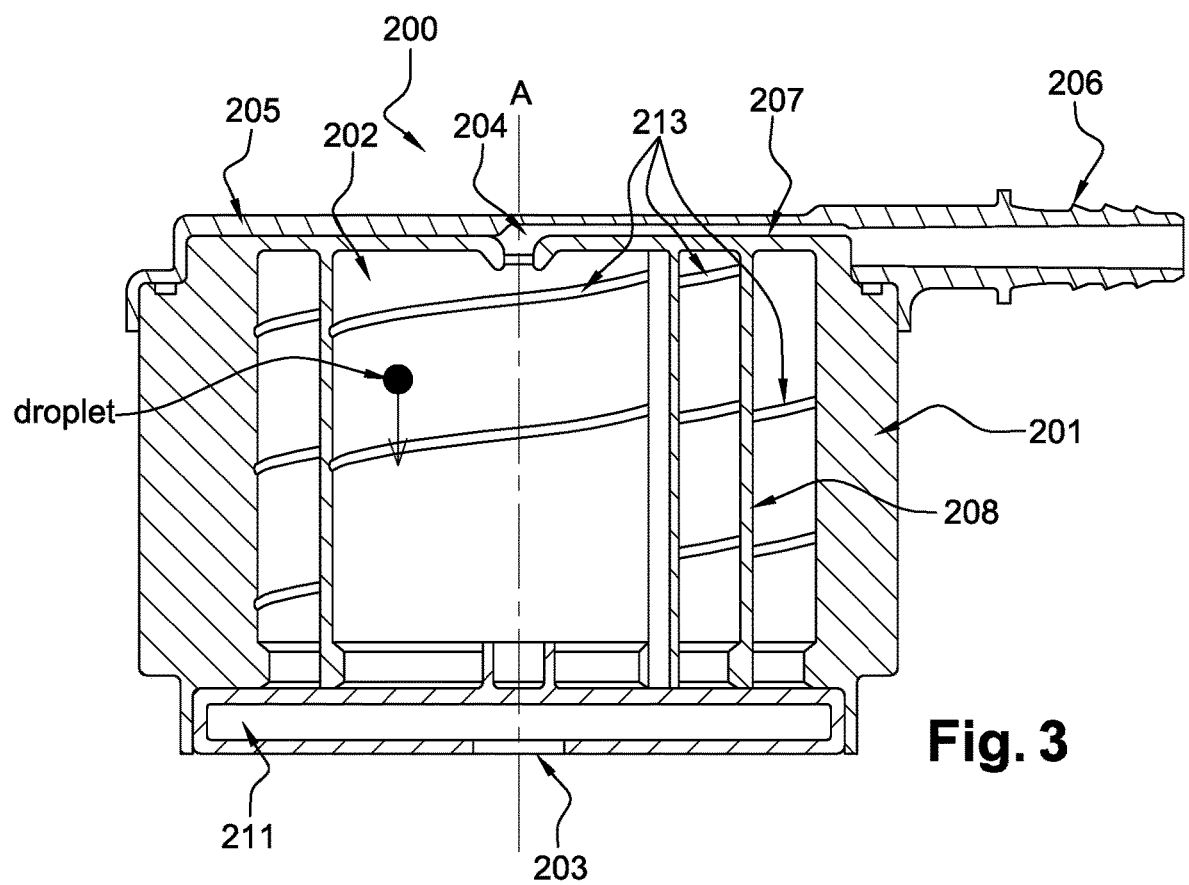
FIG. 3 illustrates schematically a cross-section view of the valve apparatus of FIG. 1, without a float.

FIGS. 2 and 3 show the valve apparatus 200 according to a particular embodiment of the present invention, with a float and without a float, respectively.

The valve apparatus 200 comprises a casing 201 defining a main chamber 202. The main chamber 202 comprises an inlet orifice 203 and an outlet orifice 204. The valve apparatus 200 comprises a cover 205, which may either be moulded as one part with the casing 201 or it may form a separate part joined to the latter by any known means (mechanical fastening with a seal; welding etc.). In the illustrated embodiment, the cover 205 is a separate part and is clipped on the top of the casing 201. The cover 205 comprises a coupling section 206 (e.g., a quick-connect coupling or a fir-tree nipple) configured to facilitate coupling to one end of a tube or a pipe and of which other end is connected to a carbon canister 300 (see FIG. 1). A venting channel 207 is defined between a portion of the cover 205 and a portion of the casing 201 and is adapted to put in fluid communication the outlet orifice 204 and the coupling section 206.

The valve apparatus 200 comprises extracting means 208 and a float 209 equipped with a needle 210 (i.e. closure element) capable of closing off the outlet orifice 204. In the example shown on FIGS. 2 and 3, the extracting means 208 comprise a spiral-shaped wall (i.e. spiral structure). Advantageously, the spiral-shaped wall (referenced 212 in FIG. 5) is made integral with the casing 201.

Figure 5:
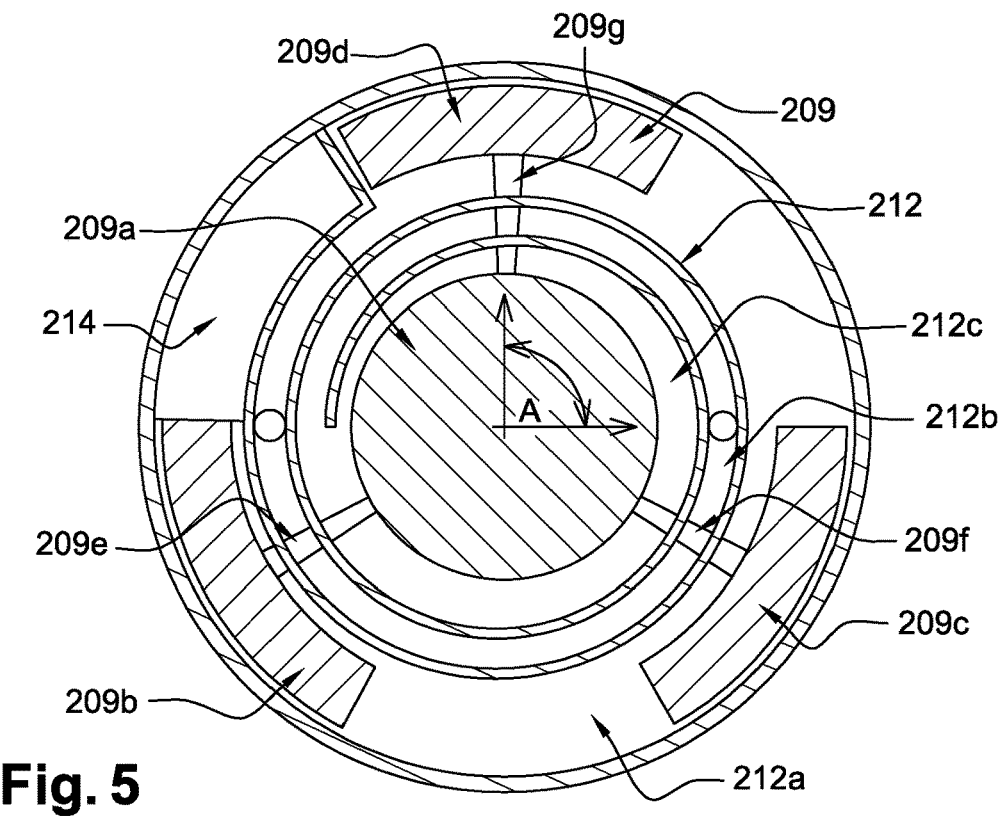
FIG. 5 illustrates schematically a top cross-section view of extracting means of the valve apparatus of FIG. 1.

Reference will now be made particularly to FIG. 5 showing a top cross-section view of the arrangement of the spiral-shaped wall 212 and the float 209.

As shown in FIG. 5, the spiral-shaped wall 212 partitions the main chamber 202 into a plurality of areas (or channels). More particularly, the spiral-shaped wall 212 delimits an outer area 212a, an intermediate area 212b and an inner area 212c. Those areas form an extended flow path. The main chamber is provided with an opening 214 for entry of fluid (gas and/or liquid) into the outer area 212a of the spiral structure. As illustrated, the opening 214 can be transversally offset with respect to the axis (A) of the casing (see FIG. 3). With this arrangement, the corking flow can be reduced. The inner area 212c is in fluid communication with the outlet orifice 204.

The float 209 comprises a main float 209a and three secondary floats (or satellite floats) 209b, 209c and 209d. The secondary floats 209b, 209c and 209d are connected to the main float 209a by three connecting members 209e, 209f and 209g, respectively. The main float 209a supports the needle 210 and is slidably disposed in the inner area 212c. The secondary floats 209b, 209c and 209d are slidably disposed in the outer area 212a. The spiral-shaped wall 212 comprises a plurality of slits (not shown) into which the connecting members may be slidably disposed. With this arrangement, the float 209 (i.e. main float 209a, secondary floats 209b, 209c, 209d, and connecting members 209e, 209f, 209g) can slide along the spiral-shaped wall 212.

Therefore, the spiral-shaped wall 212 is adapted to fulfill the following three functions:

guide the float 209 in the vertical direction, the float being movable upward and downward inside the main chamber and over the spiral-shaped wall 212;

create an extended flow path (not represented) between the inlet orifice 203 and the outlet orifice 204; and separate the fuel droplets present in a vapour stream entering the main chamber 202 via the inlet orifice 203.

When the fuel in the tank passes through the inlet orifice 203, the fuel flows towards the opening 214 and enters the outer area 212a. The fuel is forced to circulate within the casing along the extended flow path. When the fuel circulates in the outer area 212a, the secondary floats 209b, 209c, 209d start moving upward by buoyancy. Since the secondary floats 209b, 209c, 209d are connected to the main float 209a by means of the connecting members 209e, 209f, 209g, the main float 209a is simultaneously moved upward. Therefore, the needle 210 can close off the outlet orifice 204, before the fuel reaches the inner area 212c. Thus the fuel can be prevented from flowing out through the outlet orifice 204 before the outlet orifice 204 is closed by the needle 210.

The spiral structure 212 of FIG. 5 can be replaced by a multi-concentric wall structure.

Figure 6:
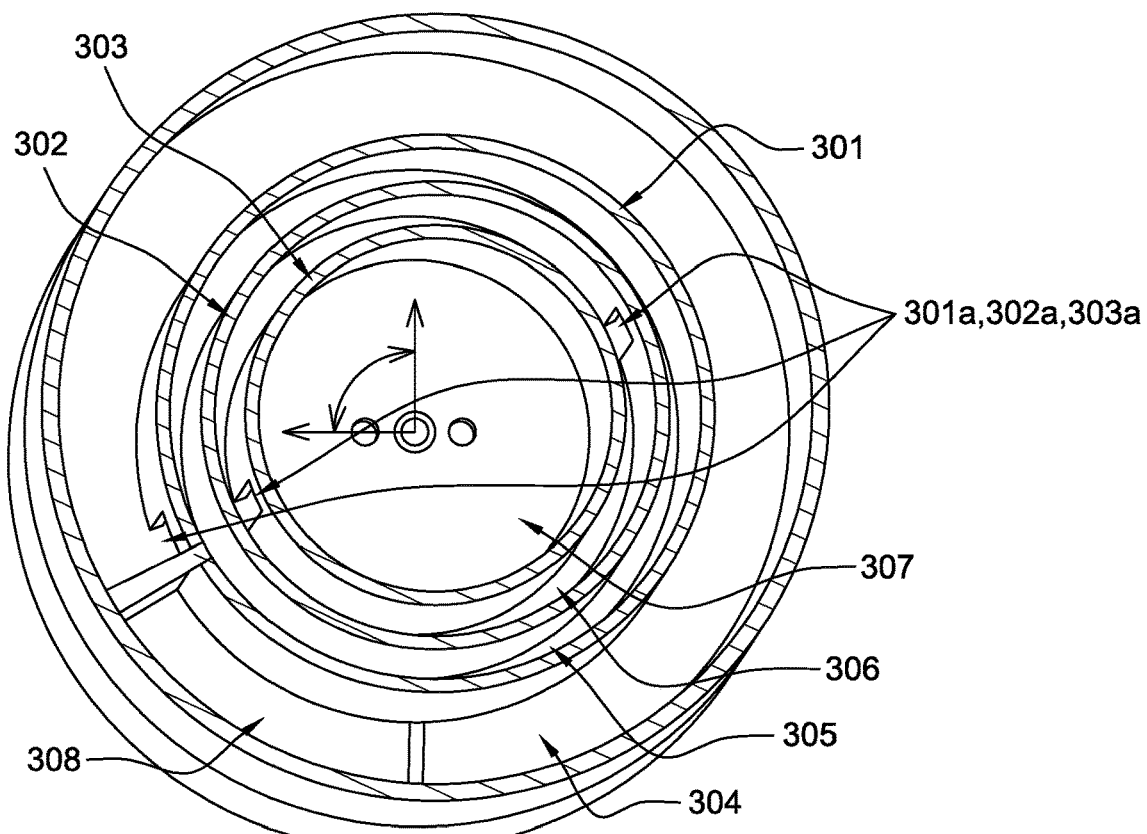
FIG. 6 illustrates schematically a top cross-section view of extracting means according to another embodiment of the present invention.

Reference will now be made to FIG. 6 showing a top cross-section view of a multi-concentric wall structure comprising a plurality of concentric walls.

As shown in FIG. 6, the concentric walls 301, 302, 303 delimit an outer area 304, a first and second intermediate areas 305, 306 and an inner area 307. Those areas form an extended flow path. The main chamber is provided with an opening 308 for entry of fluid (gas and/or liquid) into the outer area 304. As illustrated, the opening 308 can be transversally offset with respect to the axis (A) of the casing (see FIG. 3). With this arrangement, the corking flow can be reduced. The inner area 307 is in fluid communication with the outlet orifice 204. Each concentric wall 301, 302, 303 comprises a passage 301a, 302a, 303a. With this configuration, the outer area 304 can be in fluid communication with the first intermediate area 305 via the passage 301a, the first intermediate area 305 can be in fluid communication with the second intermediate area 306 via the passage 302a, and the second intermediate area 306 can be in fluid communication with the inner area 307 via the passage 303a. In the illustrated embodiment, the passages 301a, 302a, 303a are arranged at 180° to one another.

When the fuel in the tank passes through the inlet orifice 203, the fuel flows towards the opening 308 and enters the outer area 304. The fuel is forced to circulate within the casing along the extended flow path (not represented). The float described in connection to FIG. 5 can be used in the arrangement of FIG. 6. In this case, the concentric walls may comprise appropriate slits for receiving and guiding the connecting members.

As shown in FIG. 2, the valve apparatus 200 comprises a preloaded spring 220. In the event of the tank rolling over, the preloaded spring 220 and the gravity push the float towards the upward position (i.e. closed position of the valve).

As shown in FIGS. 2 and 3, the valve apparatus 200 comprises a collection and discharge chamber 211 which is enclosed within the main chamber 202 and positioned at the bottom of the main chamber 202. It is to note that the collection and discharge chamber 211 is in fluid communication with the spiral structure 212 of FIG. 5 (respectively, the concentric wall structure 301, 302, 303 of FIG. 6) via the opening 214 (respectively, the opening 308 of FIG. 6).

The collection and discharge chamber 211 may either be moulded as one part with the casing 201 or it may form a separate part joined to the latter by any known means (mechanical fastening with a seal; welding etc.). In the illustrated embodiment, the collection and discharge chamber 211 is a separate part and is clipped on the bottom of the casing 201. The collection and discharge chamber 211 has a through hole which corresponds to the inlet orifice 203. In another embodiment, the collection and discharge chamber can have a main part made integral with the casing and a separate cover part which is mountable on said main part.

Figure 4:
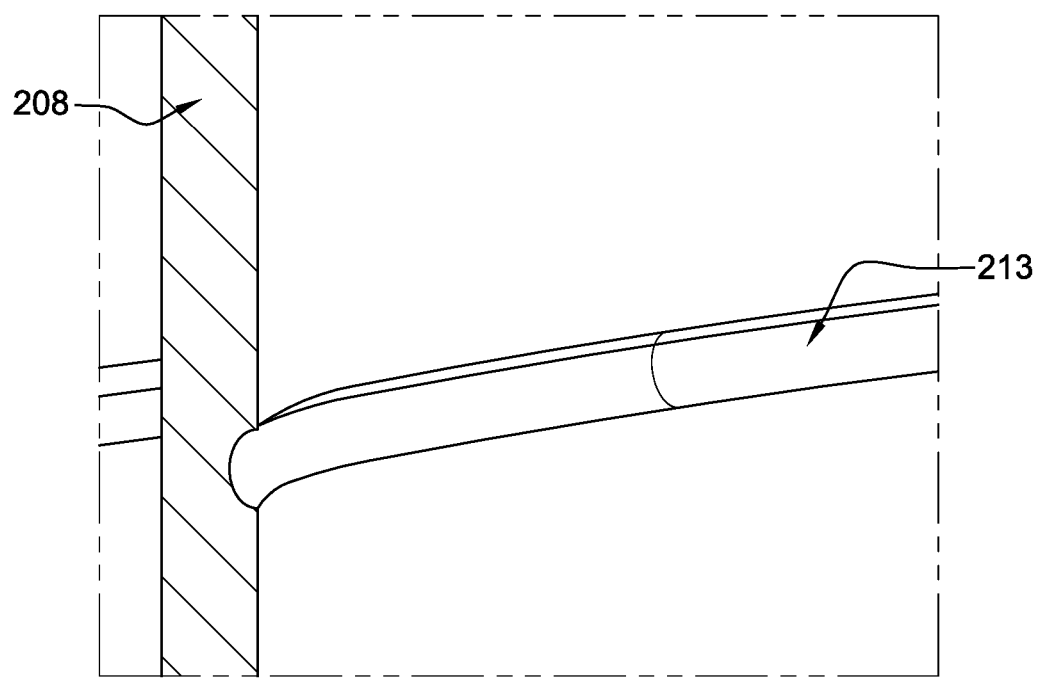
FIG. 4 illustrates schematically a protruding groove of the valve apparatus of FIG. 1.

In the particular embodiment described in relation to FIGS. 2 and 3, the spiral-shaped wall 212 comprises protruding grooves 213 adapted to guide the fuel droplets towards the collection and discharge chamber 211. FIG. 4 is an enlarged view of a protruding groove 213. In the illustrated example, the protruding groove 213 protrudes outwardly from the surface of the wall 212 and has a general gutter shape. Advantageously, the protruding grooves 213 are made integral with the spiral-shaped wall 212.

When a vapour stream passes through the inlet orifice 203, the vapour stream flows towards the opening 214 and enters the spiral structure 212. The fuel droplets present in the vapour stream are separated from the vapour stream as and when the vapour stream circulates along the spiral-shaped wall 212.

In a particularly advantageous embodiment, the fuel droplets present in the vapour stream can be separated by centrifugal forces from the vapour stream.

Indeed, with the effect of the centrifugal force and the gravity on the fluid (i.e. vapour stream), the fuel droplets are ejected on the spiral-shaped wall 212 (i.e. wall member). In contact with the spiral-shaped wall 212, the fuel droplets follow by gravity the flow path being guided by the protruding grooves 213 on the spiral-shaped wall 212. With the effect of gravity, the fuel droplets drip along the protruding groove 213 to end up into the collection and discharge chamber 211 via either an inlet orifice 203 or a specific orifice. Therefore, it is possible to reduce the risk of liquid carried over into the canister 300.

It is to note that the constituent elements of the valve apparatus according to the present invention and described above in relation to FIGS. 1-6, can be separately manufactured by injection molding process and then assembled together.

In an alternative, the entire or major part of the constituent elements of the valve apparatus according to the present invention can be manufactured by additive manufacturing process. Said additive manufacturing process can be laser additive manufacturing, laser engineered net shaping, selective laser sintering, electron-beam projection lithography, fused deposition modeling or electron beam melting. Such processes are known in the art.

Although the invention has been described hereinabove by reference to specific embodiments, this is done for illustrative and not for limiting purposes. Moreover, features disclosed in connection with one particular embodiment may be combined with features from other embodiments to obtain the same technical effects and advantages, without leaving the scope of the present invention.

For example, in an alternative embodiment, the float 209 shown in FIG. 5 can have less or more than three secondary floats. In another particular embodiment, one single member can support at least two secondary floats.

In yet an alternative embodiment, the passages 301a, 302a, 303a shown in FIG. 6 can be offset differently relative to each other.

In yet an alternative embodiment, the concentric areas (or channels) can be arranged in a staged manner. For example, the area with the smallest diameter can be positioned at the lowest stage (i.e. closest to the bottom of the main chamber) and can be configured to be fed with fluid from a next outer area with a larger diameter, which is positioned at the next stage above. With this arrangement, the length of the extended flow path can be further increased.

It is to note that the valve apparatus of the present invention can also be used in a vehicle tank for the storage of ammonia precursor solutions or ammonia solutions, the latter being especially interesting because of their high vapor pressure.

The skilled person will appreciate that other variants of the present invention may be within the scope of the attached claims.

The invention claimed is:

1. A valve apparatus for use in a liquid tank, said valve apparatus comprising:
   a casing defining a main chamber, the main chamber having an inlet orifice and at least one outlet orifice;
   a float comprising a closure element capable of closing off the outlet orifice(s), the float being movable upward and downward inside the main chamber;
   extracting means comprising at least one wall member extending substantially across the main chamber and being adapted for extracting droplets present in a vapour stream coming from the liquid tank and entering the main chamber via the inlet orifice, wherein the extracting means comprise a plurality of concentric walls defining a plurality of concentric areas, each concentric wall comprising a passage adapted to allow two adjacent concentric areas to be in fluid communication with each other,
   wherein the float is slidably mounted along said at least one wall member.

2. The valve apparatus according to claim 1, wherein the plurality of concentric areas comprise at least an outer area in fluid communication with the inlet orifice and a central inner area in fluid communication with the outlet orifice(s), and wherein the float comprises a main float supporting the closure element and at least one secondary float connected to the main float, said at least one secondary float being slidably disposed in the outer area and said main float being slidably disposed in the central inner area.

3. The valve apparatus according to claim 2, wherein the float comprises at least one connecting member for connecting said at least one secondary float to the main float, and wherein the concentric walls comprise at least one slit into which said at least one connecting member is inserted.

4. The valve apparatus according to claim 1, wherein the extracting means comprise a spiral-shaped wall.

5. The valve apparatus according to claim 4, wherein the float comprises a spiral-shaped float.

6. The valve apparatus according to claim 4, wherein the float comprises a main float supporting the closure element and at least one secondary float connected to the main float, said at least one secondary float being slidably disposed in a first area delimited by a first portion of the spiral-shaped wall, the first area being in fluid communication with the inlet orifice, and said main float being slidably disposed in a second area delimited by a second portion of the spiral-shaped wall, the second area being in fluid communication with the outlet orifice(s).

7. The valve apparatus according to claim 6, wherein the float comprises at least one connecting member for connecting said at least one secondary float to the main float, and wherein the spiral-shaped wall comprises at least one slit into which said at least one connecting member is inserted.

8. The valve apparatus according to claim 6, wherein the main chamber comprises an opening for entry of fluid into the first area, and wherein the position of the opening is transversally offset with respect to the position of the inlet orifice.

9. The valve apparatus according to claim 1, wherein it comprises a collection and discharge chamber for the droplets, which is positioned at the bottom of the main chamber.

10. The valve apparatus according to claim 9, wherein the extracting means comprise protruding grooves adapted to guide the droplets towards the collection and discharge chamber.

11. A valve assembly comprising a common support supporting a valve apparatus according to claim 1.

12. A fuel tank comprising at least one valve apparatus according to claim 1, said at least one valve apparatus being attached to said fuel tank.

13. A motor vehicle comprising a fuel tank according to claim 12.

14. A valve apparatus for use in a liquid tank, said valve apparatus comprising:
    a casing defining a main chamber, the main chamber having an inlet orifice and at least one outlet orifice;
    a float comprising a closure element capable of closing off the outlet orifice(s), the float being movable upward and downward inside the main chamber;
    extracting means comprising at least one wall member extending substantially across the main chamber and being adapted for extracting droplets present in a vapour stream coining from the liquid tank and entering the main chamber via the inlet orifice, wherein the extracting means comprise a spiral-shaped wall,
    wherein the float is slidably mounted along said at least one wall member.

15. The valve apparatus according to claim 14, wherein the extracting means comprise a plurality of concentric walls defining a plurality of concentric areas, each concentric wall comprising a passage adapted to allow two adjacent concentric areas to be in fluid communication with each other and wherein the plurality of concentric areas comprise at least an outer area in fluid communication with the inlet orifice and a central inner area in fluid communication with the outlet orifice(s), and wherein the float comprises a main float supporting the closure element and at least one secondary float connected to the main float, said at least one secondary float being slidably disposed in the outer area and said main float being slidably disposed in the central inner area.

16. The valve apparatus according to claim 15, wherein the float comprises at least one connecting member for connecting said at least one secondary float to the main float, and wherein the concentric walls comprise at least one slit into which said at least one connecting member is inserted.

17. The valve apparatus according to claim 14, wherein the float comprises a spiral-shaped float.

18. The valve apparatus according to claim 14, wherein the float comprises a main float supporting the closure element and at least one secondary float connected to the main float, said at least one secondary float being slidably disposed in a first area delimited by a first portion of the spiral-shaped wall, the first area being in fluid communication with the inlet orifice, and said main float being slidably disposed in a second area delimited by a second portion of the spiral-shaped wall, the second area being in fluid communication with the outlet orifice(s).

19. The valve apparatus according to claim 18, wherein the float comprises at least one connecting member for connecting said at least one secondary float to the main float, and wherein the spiral-shaped wall comprises at least one slit into which said at least one connecting member is inserted.

20. The valve apparatus according to claim 18, wherein the main chamber comprises an opening for entry of fluid into the first area, and wherein the position of the opening is transversally offset with respect to the position of the inlet orifice.

21. The valve apparatus according to claim 14, wherein it comprises a collection and discharge chamber for the droplets, which is positioned at the bottom of the main chamber.

22. The valve apparatus according to claim 21, wherein the extracting means comprise protruding grooves adapted to guide the droplets towards the collection and discharge chamber.

23. A valve assembly, comprising a common support supporting a valve apparatus according to claim 14.

24. A fuel tank comprising at least one valve apparatus according to claim 14, said at least one valve apparatus being attached to said fuel tank.

25. A motor vehicle comprising a fuel tank according to claim 24.

* * * * *